United States Patent [19]

Terhune

[11] Patent Number: 4,614,635
[45] Date of Patent: Sep. 30, 1986

[54] FISSION-COUPLE NEUTRON SENSOR

[75] Inventor: James H. Terhune, San Jose, Calif.

[73] Assignee: General Electric Company, San Jose, Calif.

[21] Appl. No.: 560,122

[22] Filed: Dec. 12, 1983

[51] Int. Cl.⁴ .............................................. G01T 3/00
[52] U.S. Cl. .................................... 376/154; 250/390
[58] Field of Search ............... 250/370 D, 390 R, 391, 250/392; 374/179; 376/153, 154, 247, 254, 255

[56] References Cited

U.S. PATENT DOCUMENTS

| 3,564,246 | 2/1971 | Morrison | 376/254 |
| 3,760,183 | 9/1973 | Neissel | 250/252 |
| 4,121,106 | 10/1978 | Terhune et al. | 250/390 |

FOREIGN PATENT DOCUMENTS

| 1266887 | 4/1968 | Fed. Rep. of Germany |
| 1265877 | 4/1968 | Fed. Rep. of Germany |
| 950896 | 2/1964 | United Kingdom |

Primary Examiner—Janice A. Howell
Attorney, Agent, or Firm—Ivor J. James, Jr.; Samuel E. Turner; Raymond G. Simkins

[57] ABSTRACT

Disclosed is apparatus and method which, in cooperation with an electrical system, analyzes signals generated by detectors placed in a flux field of gamma rays and neutrons. A first detector with a first sensor is coupled to the electrical system. A second detector with a second sensor is coupled to the first sensor and the electrical system. A fissile material is housed in the first detector, and is heatable by gamma ray and neutron capture to in turn heat the first sensor, which generates a first signal which is delivered to the electrical system. A non-fissile material is housed in the second detector, and is heatable by gamma ray capture to in turn heat the second sensor, which generates a second signal. The first and second signals are analyzed in the electrical system to determine the power level, neutron flux, and gamma ray flux within the flux field. Also provided is a microtechnology apparatus and method for measuring neutron flux. A first thermocouple is formed on a substrate, and is covered by a fissile material heatable by gamma ray and neutron capture. This heats the hot junction first thermocouple and generates a signal. A second thermocouple is formed on the substrate, and is covered by a non-fissile material, heatable by gamma ray capture. This heats the cold junction second thermocouple and generates a second signal. The first and second thermocouples are electrically connected to each other in juxtaposition and to the electrical system, which determines neutron flux.

8 Claims, 5 Drawing Figures

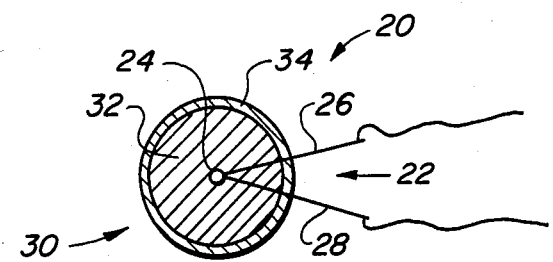
FIG._1.
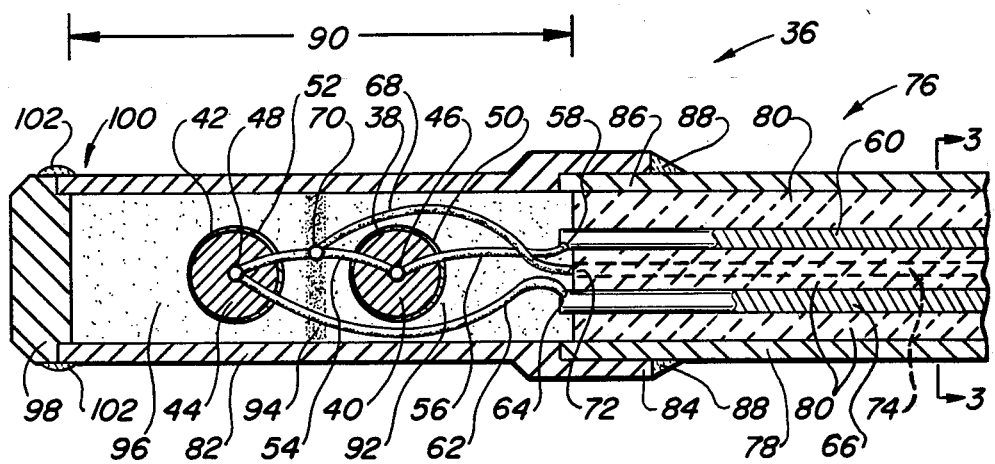
FIG._2.
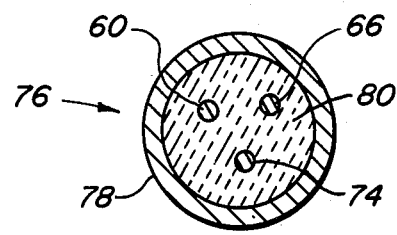
FIG._3.

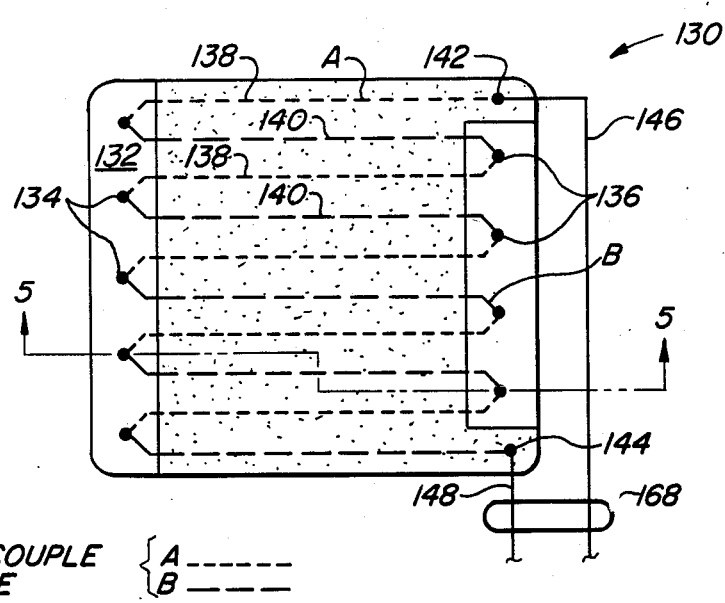
THERMOCOUPLE { A -------
WIRE          { B - - - -
FIG._4.
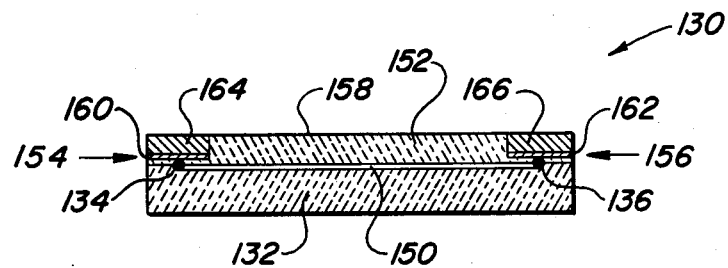
FIG._5.

FISSION-COUPLE NEUTRON SENSOR

BACKGROUND OF THE INVENTION

The field of this invention relates generally to measurement of the neutron flux within a nuclear reactor core.

Neutron sensitive detectors have for some time been the primary sensors used as incore neutron monitoring systems in conventional nuclear fission Light Water Reactors (LWR). The gas filled fission chamber has emerged as the commonly used sensor for Boiling Water Reactor (BWR) incore instrumentation, whereas the self-powered detector (SPD) is used in Pressurized Water Reactor (PWR) cores. U.S. Pat. No. 4,121,106 to Terhune and Neissel, entitled "Shielded Regenerative Neutron Detector", discloses an ion chamber type neutron detector; this patent is hereby incorporated by reference into this specification. U.S. Pat. No. 3,760,183 to Neissel, entitled "Neutron Detector System", discloses a combination of ion chambers and self-powered detectors; this patent is hereby incorporated by reference into this specification.

Alternatives to fission chambers exist in the art. One of these for example is the gamma sensitive ion chamber, now in use to calibrate the fixed incore power range sensors during power plant full power nuclear reactor operation. However, these sensors are expensive, difficult to manufacture, and somewhat delicate for general use. Another form of sensor, the previously mentioned SPD, is used in PWR's primarily for nuclear fuel management and steady state power distribution measurements. Unfortunately, SPD's do not have a prompt response, since the isotopes commonly used in the emitter electrode of the SPD typically have half-lives on the order of minutes. This precludes use of SPD's in BWR's, since the collective sensor signal is used for prompt safety functions, as well as fuel performance and power distribution monitoring. However, in those non-transient applications mentioned above, SPD's are simple in design and structure, reliable, inexpensive and long-lived.

Other approaches are much less widely used. Thermocouple sensors, in which the output signal is a function of the local gamma ray flux and therefore a measure of local power within the reactor core, have been developed and applied in European PWR's. An example is the gamma couple sensor (gamma thermometer). Unfortunately, these devices suffer from a low signal level output, and the attendant noise problems that limit their accuracy. Their response is not prompt, but can be fast enough by design that electronic and computer deconvolution methods can be applied to derive the prompt component of the gamma ray flux. These methods are very noise sensitive, and are usually too inaccurate for use in LWR safety functions. Nevertheless, the gamma couple sensor is simple, reliable, rugged, and cheap to manufacture. And unlike the ion chamber sensor, the gamma couple sensor has no gas filled volume with seals which can fail in service.

The fission couple is another thermocouple type sensor now in use. It is similar to the gamma couple, except that the source of heat for the fission couple is due to a fissionable isotope which is placed into intimate heat transferring contact with the thermocouple. As thermal neutrons induce fission in the fissile nuclei, energy is released in the form of heat, to thereby heat a locally placed thermocouple. This heating is a function of the local neutron flux. Additionally, the temperature of the fission couple is a function of the local gamma ray flux in a similar way as the gamma couple.

Advantages of these devices are that they are rugged, require no seal, and are relatively cheap and simple to manufacture. They also do not have to be powered by a voltage source because they are self-powered in the sense that a thermocouple is self-powered. Additionally, low impedance electronics can be used. Unfortunately, the component of the fission couple signal which is a function of gamma ray flux manifests itself as non-linearities in the output signal, even though the signal is typically very much larger than in a comparably sized gamma couple. Also, sensitivity of the fission couple to gamma rays limits the life of the fission couple, due to the 5:1 criteria of prompt-to-delayed signal ratio applicable to BWR safety system sensors. Fission couple lifetime is also shortened by the small size of the fissionable element, which must be small in order to obtain a reasonably fast response by the sensor. Lifetime is further shortened due to the burnup of the U-235 isotope contained in the absorber element.

Additional problems exist with present technology. Previous attempts to develop practical and useful fission couples have had limited success, principally because the sensors developed up to now have had slow response time, a short like, and produced a signal having poor linearity. Sensitivity has not been a problem, although it is known to be complementary to responsiveness.

Therefore, new or improved sensors are needed to measure the neutron flux within a nuclear reactor.

SUMMARY OF THE INVENTION

In summary, this invention provides apparatus and method for measuring neutron flux. The invention acts in cooperation with an electrical system adapted to receive and analyze signals generated by detector instruments disposed in a flux field having both gamma rays and neutrons. A first detector, provided with at least a first sensor, is disposed in a flux field of neutrons and gamma rays, and electrically coupled to the electrical system. A second detector contains at least a second sensor, electrically coupled to the first sensor; it is disposed in an environment of neutrons and gamma rays, and is electrically coupled to the electrical system. A fissile material is housed in the first detector in heat conducting relation with the first sensor. The fissile material is heatable by gamma ray and neutron capture, and in turn is capable of heating the first sensor, to generate as an output a first signal which is delivered to the electrical system. A non-fissile material is housed in the second detector in heat conducting relation with the second sensor. The non-fissile material is heatable by gamma ray capture, and is in turn capable of heating the second sensor, which generates as an output a second signal. This second signal is capable of being analyzed with the first signal in the electrical system, to determine the neutron flux within the flux field.

Additional features of this first embodiment include: using thermocouples as the sensors; disposing the sensors in metallic spheres; using a ratio of uranium isotopes of 79% U-234:21% U-235 to form the layer of the mixture of fissile material; matching the gamma ray absorption characteristics of the first and second sensors; providing substantially identical volumes for the detectors.

To summarize a second embodiment, provided is a microelectronic apparatus and method for measuring the neutron flux in a flux field having at least gamma rays and neutrons. The apparatus comprises at least a first thermocouple, formed on a first substrate, covered at least in part by a fissile material capable of being heated by gamma ray and neutron capture. The heated fissile material in turn heats the first thermocouple to cause it to generate a first signal, which first thermocouple thereby functions as a hot junction. At least a second thermocouple is formed on a second substrate and covered at least in part by a non-fissile material capable of being heated by gamma ray capture. The heated non-fissile material in turn heats the second thermocouple to cause it to generate a second signal; this second thermocouple thereby functions as a cold junction relative to the hot junction. Also provided is a means for electrically connecting the first and second thermocouples to each other, and to an electrical system which is capable of determining the neutron flux within the flux field from the first and second signals.

Additional features of this second embodiment include: combining a plurality of first and second thermocouples connected in series to form a thermopile; providing an insulating substrate formed from a high quality ceramic material; using the two tradenamed alloys chromel and alumel materials as the first and second wires to form the singular as well as the plurality of thermocouples; using a mixture of U-234 and U-235 to form the fissile material; housing the detectors in a sealed housing which is packed in a mineral insulated material.

BRIEF DESCRIPTION OF THE DRAWINGS

The accompanying drawings, which are incorporated into and form a part of this invention specification, illustrate preferred embodiments of the invention. The drawings serve to explain the principles of the invention when read together with the example construction and operation of the invention according to the embodiments provided in the Detailed Description of the Preferred Embodiments, discussed below.

In the drawings:

FIG. 1 is a schematic cross-sectional view of an example structure of a generalized detector according to a first embodiment of the invention;

FIG. 2 is a detailed cross-sectional view of first and second detectors, fabricated in accordance with the FIG. 1 detector, disposed in a housing and connected to a cable, according to a first embodiment of the invention;

FIG. 3 is a cross-sectional view of the FIG. 2 cable taken along the section 3—3;

FIG. 4 is a top cutaway view of the detector according to a second embodiment of the invention; and FIG. 5 is a cross-sectional view of the FIG. 4 second embodiment of the invention, taken along the section 5—5.

DETAILED DESCRIPTION OF THE PREFERRED EMBODIMENTS

Broadly stated, the novel sensor offered by this invention and its associated electronics provides a gamma ray compensated and temperature compensated breeding fission couple sensor. The sensor produces an analog output signal which can be filtered, digitized, and deconvoluted by a digital microprocessor, to provide a real-time measure of the "prompt" neutron flux, such as is found within the core of a conventional nuclear fission reactor. The sensor is self-powered, utilizes conventional low impedance DC electronics, and desirably lacks the seals and gas of existing sensors. The sensor is desirably designed for long life and ruggedness, and for producing an output signal having low noise levels, and high measurement accuracy. The sensor can be designed to have a fast response time, in the order of twenty five milliseconds, which is adequate for use in existing safety related systems of LWR's.

FIG. 1 is a cutaway schematic view of a generalized active detector element 20 according to the first embodiment of the invention. A thermocouple 22 is created at junction 24 by joining together in known ways a first wire 26 and a second wire 28, typically consisting of thermocouple alloys such as commonly used chromel and alumel to form the preferred embodiment. Both wires have a very small diameter, on the order of from one to two mils. Thermocouple junction 24 is cast in the nominal center of a first sphere 30, housing a filler material 32 preferably comprised of a metallic alloy, discussed below.

A thin shell 34 surrounds filler material 32, and preferably is comprised of a thin layer of gold a few mils thick. Shell 34 may be selected from a group of materials including gold, platinum, and palladium; the preferred material is gold because of its superior thermal conductivity and because it can be made very thin, in the range of from 0.1 to 0.3 mils, and preferably 0.2 mils. Sphere 30 is typically in the range of from 35 to 40 mils in diameter, and is either (1) the source of fission heating and gamma ray heating of junction 24 if filler material 32 has a fissile component, or (2) the source of only gamma ray heating of junction 24 if filler material 32 is composed of a non-fissile material. As the filler material 32 is heated, the thermocouple 22 operates in the conventional manner to develop a voltage across the output wires 26 and 28, which has a functional dependence on the temperature at the thermocouple junction.

The voltage generated across wires 26 and 28 due to heating of the filler material 32 is composed of either one or two signal components, plus noise which is not directly related to the power in the gamma ray and neutron flux field. If filler material 32 consists of a nonfissile metal, the output voltage signal appearing across wires 26 and 28 is (1) noise plus (2) a voltage signal due to gamma absorption in (a) the sphere, (b) thermocouple junction, and (c) wires 26 and 28 where they reside within the flux field. As is known in the art, gamma ray heating is accomplished by absorption of gamma rays by a material such as filler material 32. The amount of thermal heating experienced by the filler material 32 is proportional to the flux of gamma rays which bombard filler material 32.

If, on the other hand, filler material 32 consists of a fissile material such as a mixture of various uranium isotopes, in this preferred embodiment comprising U-234 and U-235 isotopes in the respective proportions of approximately 79% U-234:21% U-235, then the output voltage signal appearing across wires 26 and 28 represents the signal contributors of (1) gamma absorption, (2) U-235 fissioning and (3) noise, and (4) also again including heating due to (a) neutron and (b) gamma ray absorption by thermocouple junction 24 and (c) the portions of wires 26 and 28 residing within the flux field. As described in U.S. Pat. No. 4,121,106 to Terhune and Neissel entitled "Shielded Rejenerative Neutron Detector", which patent is hereby incorporated by reference into the specification, the purpose of U-234 is to increase the usable life of the detector element 20 by the generation of U-235 through the process of epithermal neutron capture in U-234, a process having negligible affect on the temperature within detector element 20, and therefore contributing negligible unwanted signal voltage across wires 26 and 28.

The foregoing discussion leads to the conclusion that, if (1) the gamma ray mass absorption properties of a FIG. 1 sphere 30 containing non-fissile filler material 32 are chosen to be approximately equal to, (2) the gamma ray mass absorption properties of a FIG. 1 sphere 30 containing a fissile filler material 32, then (3) the voltage signal across wires 26 and 28 will have gamma ray absorption signals which are essentially identical for a sphere 30 containing non-fissile material and a sphere 30 containing fissile material as the filler material 32.

Further, if two FIG. 1 spheres 30, one containing a non-fissile filler material 32 and the other containing a fissile filler material 32, are electrically coupled through the junction 24 residing within each of the two spheres 30, then the output voltage signal of the FIG. 1 pair of thermocouples 22 is essentially zero in the absence of a neutron flux, even though a gamma ray flux is present. Additionally, common-mode noise due to thermal fluctuations is rejected because the output signals of the two spheres 30 cancel due to juxtaposition, which common-mode noise rejection has the benefit of producing a low noise output signal. Properly chosen gamma ray mass absorption properties of the non-fissile versus the fissile sphere include consideration of such properties as density and atomic number, which fall in the range of from 74 to 92, but preferably approximately 92.

FIG. 2 is a side cutaway view according to one embodiment of the invention, wherein two FIG. 1 detector elements 20 are used, one containing a fissile filler material 32 and the other containing a non-fissile filler material 32; the detectors are cooperatively arranged to provide the inventive apparatus of the FIG. 2 sensor 36. First detector 38, essentially identical in structure to the FIG. 1 detector element 20, is filled with a first material 40, which in this case is a fissile material. Second detector 42, also essentially identical in structure to the FIG. 1 detector element 20, is filled with a second material, which in this case is a properly chosen non-fissile material, selected for its gamma absorption properties.

Detectors 38 and 42 preferably have a spherical shape. Positioned near the center of first detector 38 is a first thermocouple 46, formed in essentially the manner identical as the FIG. 1 thermocouple 22. In a similar manner, second thermocouple 48 is likewise positioned near the center of second detector 42. First and second shells 50 and 52 are formed on the surface of detectors 38 and 42 in a manner essentially identical to the FIG. 1 shell 34 formation around detector element 20. Thermocouples 46 and 48 are electrically coupled to each other through first wire 54. First thermocouple 46 is connected through second wire 56 to the junction 58 at the base of first lead 60. Likewise, second thermocouple 48 is connected through third wire 62 to junction 64 at the base of second lead 66.

Finally, an optional fourth wire 68 electrically couples first wire 54 through junction 70 to junction 72 provided at the base of third lead 74, indicated by dash lines as shown. Fourth wire 68 and third lead 74 are optional, but preferably are included in order to provide a temperature sensing means for directly monitoring the nuclear reactor core (not shown) temperature when the nuclear reactor is in the shutdown condition. During shutdown, the non-fissile detector 42 generates a measurable voltage which is related to the temperature in the core.

A cable 76 is comprised of a sheath 78 surrounding the previously mentioned first lead 60, second lead 66, and third lead 74. Cable 76 preferably has a circular cross-section. Disposed within the sheath 78 is first insulation 80 substantially surrounding leads 60, 66 and 74, and at the same time electrically isolating these three leads from the sheath 78. First insulation 80 is selected from a group of commercially available insulation materials, such as silica, alumina, or magnesia, or combinations of them.

A jacket 82, preferably selected from materials including type 304 or 316 stainless steel, is formed into a tube having a circular cross-section. Jacket 82 at one end (at its right end in FIG. 2) is provided with a lip 84 which creates an opening having a diameter greater than that of jacket 82 and capable of receiving cable end 86. Cable end 86 is securely fastened to jacket 82 by such means as weld 88, which in this preferred embodiment would be a single weld 88 encircling both the jacket 88 at its lip 84 and cable end 86.

In the process of fitting jacket 82 around cable end 86, jacket 82 is also fitted to surround first detector 38 and second detector 42. Into the chamber 90 created by the joining of jacket 82 to cable end 86 is placed second insulation 92, capable of providing thermal contact and electrical insulation. Preferably this second insulation 92 is a fine powder of beryllium oxide (BeO), which provides thermal contact between the detectors and the interior walls of jacket 82, and further provides electrical isolation between the detectors and jacket 82. Insulation 92, preferably in the form of a fine powder, is compacted using known methods such as ultrasonic compaction. Second insulation 92 is the first layer of insulation placed within chamber 90.

Next, powdered third insulation 94 is poured over second insulation 92 to substantially cover it. Third insulation 94 is selected from materials including magnesium oxide and silicon oxide; it provides a thermal barrier between first detector 38 and second detector 42. Third insulation 94 is disposed within the space between detectors 38 and 42, and does not contact either detector. Finally, fourth insulation 96 is put into place in chamber 90, to substantially cover third insulation 94 as well as second detector 42. This fourth insulation 96 provides the third layer of insulation material positioned within chamber 90. Fourth insulation 96, like second insulation 92, is designed to provide good thermal contact between detector 42 and the inside wall of jacket 82, while simultaneously providing electrical isolation between detector 42 and jacket 82. A suitable material for fourth insulation 96 is beryllium oxide, which in this preferred embodiment is the same insulation used for second insulation 92. All three layers, preferably fine powders, are compacted using known methods such as ultrasonic compaction.

Finally, an end cap 98 is secured to the outside end 100 of jacket 82, by such attachment means as welds 102, which for a circular jacket 82 would be one continuous weld surrounding the circumference of jacket 82 and end cap 98. Chamber 90 is thus enclosed to form a water tight electrical voltage source whose voltage is a function of the local thermal neutron flux.

FIG. 3 is a cross-section of the FIG. 2 cable 76, taken along the line 3—3. To improve the perspective, the FIG. 3 cross-section of cable 76 is rotated 90° counterclockwise with respect to the FIG. 2 cable 76. As previously stated, the FIG. 3 cable 76 preferably has a circular cross-section and includes the previously mentioned leads 60, 66, and 74, encapsulated in first insulation 80, all of the preceding housed within sheath 78 of cable 76.

During operation, the sensor assembly is placed into a flux field which includes gamma rays and neutrons. The first (fissile) detector 38, in which is housed the first (fissile) material 40, is thermally heated by neutron and gamma ray capture, to generate in first thermocouple junction 46 a voltage signal across wires 56 and 54. In a similar manner, second (non-fissile) detector 42 houses the second (non-fissile) material 44 which is heated by gamma ray capture (but not neutron capture), to thereby be thermally heated. Heated material 44 in turn thermally heats the second thermocouple junction 48, to thereby generate a voltage across wires 54 and 62. Because gamma ray heating is occurring in both detectors 38 and 42, and because thermocouples 46 and 48 are electrically coupled through wire 54, the gamma ray heating occurring in each detector 38 and 42 cancels out the electrical signal in response to the gamma ray heating. This cancelling action produces a resultant signal in wires 62 and 68 which is indicative of essentially only the neutron flux, the gamma ray flux signal having been essentially eliminated. Because the neutron flux is directly related to the voltage generated by detectors 38 and 42, the signal emerging through leads 60 and 66 provide a direct measure of the neutron flux within the reactor core. This invention of sensor 36 thus provides a rugged means of power range neutron monitoring using regenerative neutron sensors and amenable to digital signal processing.

Typical sensor 36 dimensions include approximately a 100 mil outside diameter, a range of from 200 to 300 mils active length 90 as measured from end cap 90 to cable end 86, and a length of cable 76 sufficient to exit the reactor core and vessel. Preferably, at least four of the sensors 36 are combined in mechanical assemblies (not shown) to sense both the axial as well as the radial gamma ray and neutron flux distribution in the reactor core, as described in the above referenced U.S. Pat. No. 4,121,106 to Terhune and Neissel. The output signal emerging through leads 60 and 66 is a DC voltage in the range of from approximately 10 up to approximately 1,000 microvolts in normal operation of the nuclear reactor at steady-stage. Under transient neutron and gamma ray conditions, the DC output transient signal lags in time behind the instant in time of the actual flux transient, and therefore requires signal processing to provide an accurate measure of the instantaneous flux at the instant of the transient.

An additional advantage offered by the FIG. 2 configuration of first detector 38 and second detector 42 is that the output signals generated by thermocouples 46 and 48, travelling respectively through wires 56 and 62 and on through leads 60 and 66, are essentially independent of the thermal temperature of the environment. According to this preferred embodiment, the thermal temperature of the environment will be the temperature of the nuclear reactor coolant in which sensor 36 is immersed, with the desirable consequence that sensor 36 is temperature compensated. In the context of this invention, the expression "temperature compensated" means that the interaction of the signals of first (fissile) detector 38 and second (non-fissile) detector 42, through the electrical coupling wire 54, essentially cancel out that signal component representative of the temperature of the environment in which sensor 36 resides. Therefore, the output signal through leads 60 and 66 does not include a substantial thermal temperature component due to this resident environment. This desirable feature of temperature compensation is in addition to the previously mentioned gamma ray compensation of the electrically coupled detectors 38 and 42.

FIG. 4 is a top cutaway view according to a second embodiment of the invention. In FIG. 4, the sensor 130 is comprised of an apparatus manufactured according to conventional semiconductor manufacturing techniques. This second embodiment employs microtechnology in order to increase the overall signal output generated by sensor 130.

Broadly stated, FIG. 4 and FIG. 5 show a second embodiment according to the invention. FIG. 5 is a cross-sectional side view taken along the FIG. 4 section 5—5. In an insulator substrate 132, a plurality of hot junctions 134 and cold junctions 136 are formed, all of which junctions are thermocouples. A plurality of first wires 138 and second wires 140 are joined as shown to produce junctions 134 and 136. Wires 138 are comprised of the same (first) metallic material, and wires 140 are comprised of the same (second) metallic material but which (second) metallic material differs from the (first) material used to form wires 138.

Wires 138 and 140 are connected to form junctions 134 and 136 in an alternate fashion as shown, such that the junctions create thermocouples. Such an array is typically referred to as a thermopile. At opposite ends of the array of junction 134 and 136, junctions 142 and 144 are electrically connected to respective leads 146 and 148, which in turn are connected to suitable electronics. In use, the hot junctions 134 and the cold junctions 136 are placed in a source of neutron flux. The thermocouples become heated to generate a DC voltage which is output through leads 146 and 148 to differential amplifier 168.

More particularly, with reference to FIG. 4 and FIG. 5, standard microtechnology is used in forming an insulator substrate 132 as a first step in fabrication of sensor 130. Next, the conductor layer 150 (comprised of hot junctions 134, wires 138 and 140, and cold junction 136) is formed on the insulator substrate 132. A top layer insulator 152 is then formed over the substrate 132 and conductor layer 150, to thereby seal and electrically insulate the components of the conductor layer. Conventional photomasking techniques are used to etch a hot plane 154 and a cold plane 156 in top layer 152, which planes 154 and 156 are at a level below the upper surface 158 of top layer 152.

Planes 154 and 156 are then metallized to form hot metallized layer 160 and cold metallized layer 162. Onto the hot metallized layer 160 is evaporated a mixture of U-234 and U-235 in the ratios as stated above. Onto the cold metallized layer 162 is evaporated an inert (i.e., non-fissile) metal. Fissile layer 164 is formed from a fissile material, and inert layer 166 is formed from an inert metal. Typical dimensions of active element defined in FIG. 4 and FIG. 5 are 0.20 inches in length, 0.070 inches in width, and 0.040 inches in thickness. As shown in FIG. 4, leads 146 and 148 are packed in a mineral insulated cable to provide electrical insulation. A principal advantage of the FIG. 4 and FIG. 5 construction of sensor 130 is that as many hot junctions 134 and cold junctions 136 can be formed as desired in order to increase the strength of the output signal across leads 146 and 148.

An obvious alternate embodiment for the FIG. 4 planar projection is to form the FIG. 4 sensor 130 onto the surface of a cylinder upon which the various layers of the FIG. 5 sensor 130 are deposited to achieve a similar result.

This invention, illustrated in the two above example preferred embodiments, offers numerous improvements and advantages over the prior art. Neither high voltage seals nor gas seals are required, in contrast to those required in the currently used ion chamber sensors. This provides for a simple, compact, rugged design that can be manufactured more cheaply than existing sensors. Reliability of performance is enhanced because there are no seals which can crack in service, thereby eliminating undesirable transient sensor behavior due to, for example, gas migration in an ion chamber sensor between the sensor and the cable. The FIG. 2 sensor 36 is gamma compensated, thereby increasing its neutronic life beyond that of existing designs. Sensor longevity will be dictated by electronic limits, and the ultimate burnup of the uranium content of the fissile material contained in the FIG. 2 detector 38 and FIG. 5 fissile layer 164 while in service. Furthermore, the sensor is an inherently low noise device, since common mode rejection is implicit in its design.

This invention offers an opportunity to provide diversified methods of measuring core power distribution. The use of this invention in combination with the presently used ion chambers lessens the chances of a common mode failure of the neutron sensors and thereby increases reactor safety. The invention offers the potential of greater accuracy, better linearity, and operation closer to the actual power limits in nuclear power plants.

The foregoing detailed description of the example preferred embodiments of the invention have been presented solely for purposes of illustration and description. This detailed description is not intended to be exhaustive, or to limit the invention to the precise form disclosed. Obviously, many modifications and variations are possible in light of the above teaching. The example preferred embodiments were chosen and described in order to best explain the principles of the invention and the invention's practical application, to thereby enable others skilled in the art to best utilize the invention in various other embodiments not described above, and with various modifications as are suited to the particular use contemplated. It is intended that the scope of the invention be defined solely by the appended claims.

What is claimed is:

1. Microtechnology apparatus for measuring the neutron flux level in a flux field having at least gamma rays and neutrons, comprising:
   (a) at least a first thermocouple, formed on a substrate, covered at least in part by a fissile material capable of being heated by gamma ray and neutron capture, which in turn heats the first thermocouple to cause it to generate a first signal, which first thermocouple thereby functions as a hot junction;
   (b) at least a second thermocouple, formed on said substrate, covered at least in part by a non-fissile material capable of being heated by gamma ray capture, which in turn heats the second thermocouple to cause it to generate a second signal, which second thermocouple thereby functions as a cold junction; and
   (c) means for electrically connecting the first and second thermocouples to each other, and to an electrical system which is capable of determining the neutron flux within the flux field from said first and second signals.

2. The apparatus of claim 1, wherein a plurality of first and second thermocouples are electrically connected in series to form a thermopile.

3. The apparatus of claim 1, wherein the substrate functions as an insulator.

4. The apparatus of claim 1, wherein the substrate is a high quality ceramic material.

5. The apparatus of claim 1, wherein the substrate is an insulator fabricated from a high quality ceramic selected from the group including alumina, magnesia, silica, and beryllia.

6. The apparatus of claim 1, wherein the first and second thermocouples are formed by joining together a wire of chromel and a wire of alumel.

7. The apparatus of claim 1, wherein the fissile material includes an alloy of U-234 and U-235.

8. The apparatus of claim 1, wherein the non-fissile material is an inert metal.

* * * * *